United States Patent Office 3,349,833
Patented Oct. 31, 1967

3,349,833
PRESSURE MOLDING VENTING METHOD
Fritz Hodler, 28 Ave. de Collonge,
Territet, Switzerland
Filed Nov. 13, 1964, Ser. No. 410,932
Claims priority, application Germany, Nov. 14, 1963,
H 50,849
3 Claims. (Cl. 164—113)

ABSTRACT OF THE DISCLOSURE

The air vent in the die of a diecasting machine has a spring-loaded normally closed valve which may be held open by a trapped body of pressure fluid from the die closing mechanism. The fluid is released by a pilot valve which responds to the sudden pressure rise in the hydraulic fluid injection mechanism which occurs when the injected liquid metal enters the vent from the wider die cavity.

This invention relates to a pressure molding method.

It is known to provide pressure molding machines such as diecasting machines or injection molding machines for thermoplastic resin compositions with dies having relatively large vents which remain open during injection of the liquid molding material into the mold cavity to facilitate escape of air and other gases from the cavity, and which are blocked by a valve when the cavity is filled in order to prevent escape of the molding material through the vent. The valve is actuated in one known device at a fixed time after initiation of the molding material injection, and other devices rely on other steps in the injection cycle for generating a signal which causes closing of the valve in the vent. The known methods cannot reliably close the vent at the most favorable moment under varying operating conditions.

The primary object of this invention is the provision of an operating method and of a vent control mechanism for a pressure molding machine which cause reliable closing of the vent valve at the precise moment when all air or other gases have been swept from the mold cavity, and before any liquid molding material can escape from the die, and regardless of those variations in operating conditions which are usual in the operation of molding machines.

With this object and others in view, the invention, in one of its aspects provides a novel method of operating a pressure molding machine having a die formed with a cavity and a vent conduit of substantially smaller flow section than the flow section of the cavity and communicating with the same, the machine including fluid operated injecting means for forcing a liquid molding material into the cavity, there being an increase in the pressure of the operating fluid in the mechanism when the liquid molding material enters the vent conduit from the cavity. The method of the invention is characterized by the step of blocking the vent conduit in response ot this pressure increase.

More specifically, a signal is generated in response to the entry of the molding material from the cavity into the vent conduit under the forcing action of the injecting means, and the vent conduit is blocked in response to the signal.

The method is particularly applicable to pressure molding machines in which injection is effected by means of a pressure fluid operated plunger, signals being generated by the pressure changes in the operating fluid, and the vent conduit being blocked in response to the signal generated by a pressure increase in the operating fluid which is caused by entry of the molding material into the vent conduit under the forcing action of the plunger.

In another aspect, the invention mainly resides in a pressure molding apparatus in which the die has two halves movable relative to each other toward and away from a closed position, the die when in the closed position defining a mold cavity, a vent conduit, and gate means, the vent conduit and gate means communicating with the cavity for flow of fluid from the gate means through the cavity into the conduit, the flow section of the conduit being substantially smaller than that of the flow section of the cavity. Injecting means are provided for forcing liquid molding material through the gate means into the cavity. Signal generating means generate a signal in response to the entry of liquid molding material into the conduit from the cavity under the force of the injecting means, and valve means in the conduit and operatively connected to the signal generating means block the conduit in response to the signal.

Other features and many of the attendant advantages of this invention will be readily appreciated as the same becomes better understood by reference to the following detailed description of preferred embodiments when considered in connection with the accompanying drawings in which.

Figure 1:
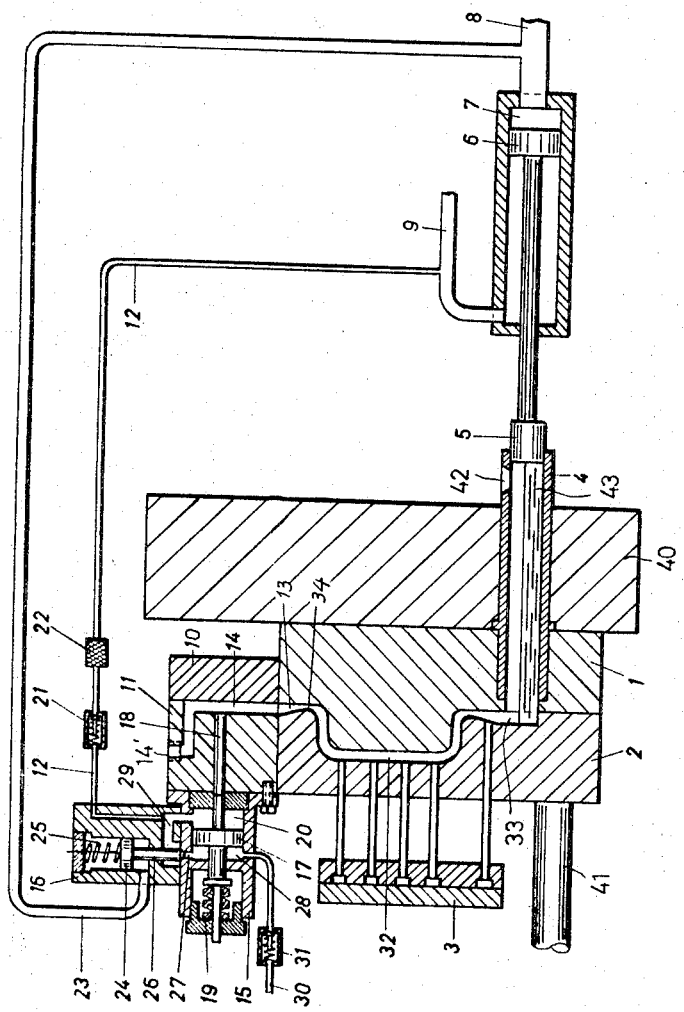
FIG. 1 illustrates as much of a pressure-molding machine as is necessary for an understanding of the invention, the machine being equipped with a vent control mechanism of the invention, the view being in elevational section and partly diagrammatic.

Referring now to the drawing in detail, and initially to FIG. 1, there is seen a plate 40 of a stationary support structure, not otherwise shown. A stationary die half 1 is fixedly attached to the plate 40. In the illustrated position of the die, the stationary die half 1 and a movable die half 2 define therebetween a mold cavity 32 having an inlet or gate 33 and an outlet conduit 13 for venting air and other gases. The conduit 13 has a narrowly constricted throttling portion 34 near its junction with the mold cavity. Two blocks 10, 11, respectively fastened to the die halves 1, 2, jointly form an extension 14 of the outlet conduit 13 which terminates in a threaded outlet orifice 14'.

The mechanism for moving the die half 2 toward and away from the illustrated closed position of the die may be entirely conventional, and is represented in the drawing only by a heavy bar 41 attached to the movable die half 2. The die closing mechanism will be understood to be fluid pressure operated as is conventional. The movable die half 2 carries an ejection mechanism 3 including several knock-out pins, but not otherwise illustrated in detail.

The gate portion 33 of the die communicates with an injection cylinder 4 in which a plunger 5 is axially movable. A feed opening 42 in the cylinder 4 permits changing of the cylinder with the material 43 to be injected into the mold cavity 32 while in liquid condition. Movement of the plunger 5 is actuated by a double-acting hydraulic cylinder 7 whose piston 6 is mounted on a common rod with the plunger 5. The hydraulic circuit of the cylinder 7 is represented in the drawing by two supply conduits 8, 9, which respectively communicate with the two axial ends of the cylinder 7 and are connected alternatively in a conventional manner, not further illustrated, to a source of fluid under pressure, such as a pump, or to a low-pressure dainage receptacle or sump by a control valve so that pressure fluid supplied by the conduit 8 actuates injection of the material 43 into the mold cavity 32 while the conduit 9 is connected to the sump, and fluid supplied to the cylinder 7 through the conduit 9 actuates withdrawal of the plunger 5 to the illustrated position while the conduit 8 is connected to the sump.

Figure 2:
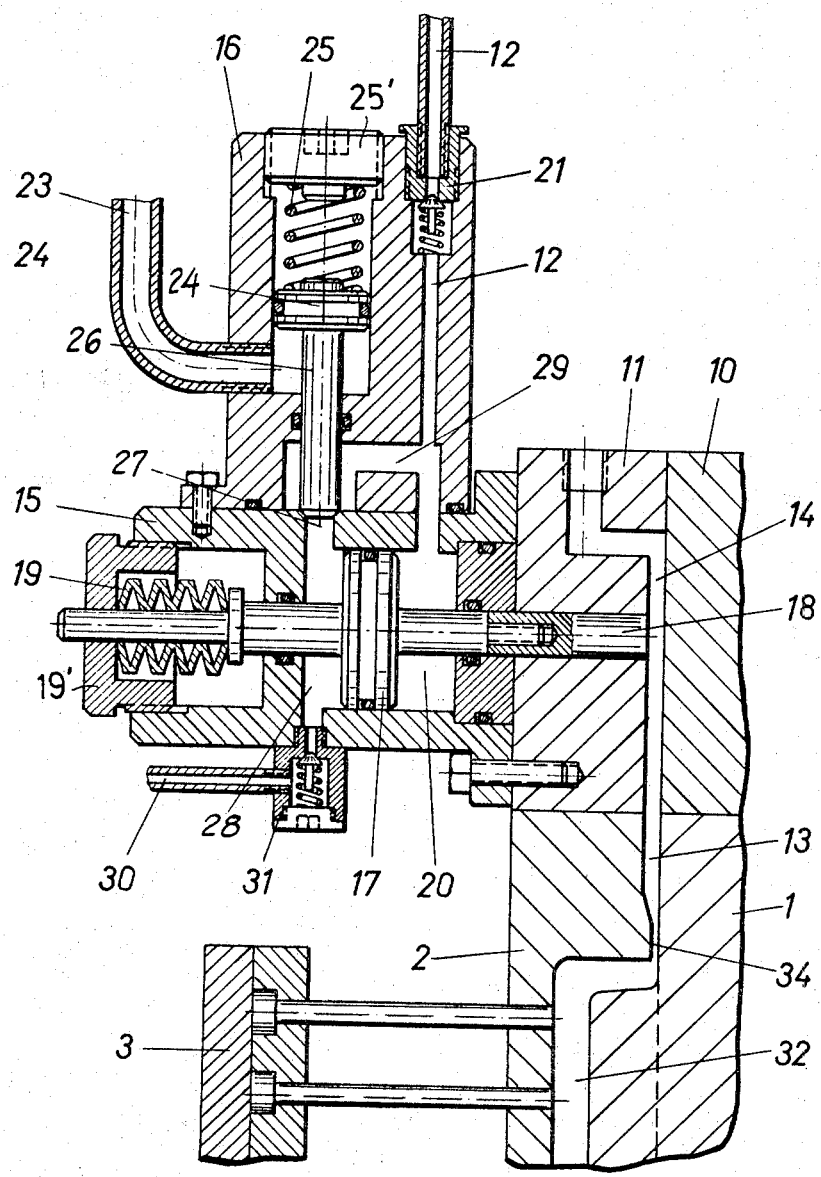
FIG. 2 shows a detail of the apparatus of FIG. 1 on a larger scale.

The block 11 carries a fluid-operated shut-off valve 15 which is better seen in FIG. 2. A piston 17 divides a cylinder space within the valve 15 into two compartments 20, 28, which are connected by a duct 29. A composite stem or rod 18 is coaxially mounted in the piston 17 and extends therefrom in two opposite directions. The portion of the rod 18 which is located in the compartment 20 during the axial movement of the piston is of smaller cross sectional area than the rod portion which moves in the compartment 28. The terminal portion of the rod 18 adjacent the compartment 20 moves into and out of the extension conduit 14 during piston movement and blocks the conduit 14 when positioned therein. The other terminal portion of the rod 18 carries a biasing spring 19 which is interposed between a shoulder of the rod 18 and a threadedly adjustable cap 19'. The spring 19 urges the rod 18 to move toward its blocking position in the conduit 14.

An auxiliary valve 16 controls the operation of the valve 15 to which it is attached. A piston 24 is axially movable in a cylinder space of the auxiliary valve 16. The rod 26 of the piston 24 extends into the connecting duct 29 and blocks the orifice 27 of the valve compartment 28 under the urging of a helical compression spring 25 in the illustrated position of the device. A threaded cap 25' permits the tension of the spring 25 to be adjusted.

The valve compartment 20 is connected with the conduit 9 by a first control conduit 12 (FIG. 1), and the cylinder space in the auxiliary valve 16 is connected to the conduit 8 by a second control conduit 23 which enters the conduit 8 immediately adjacent the cylinder 7. A vent conduit 30 leads from the valve compartment 28 to the non-illustrated fluid pressure circuit of the die closing mechanism.

An adjustably spring-loaded check valve 21 in the conduit 12 selectively prevents fluid flow from the valve 15 to the conduit 9. Another similar check valve 31 in the vent conduit 30 selectively prevents fluid flow inward of the valve compartment 28. A filter 22 in the control conduit 12 protects the check valve 21.

The afore-described apparatus is operated as follows:

In the illustrated condition of the apparatus, the plunger 5 is held in retracted position by fluid under pressure from the conduit 9 whereas the conduit 8 is connected with the non-illustrated low-pressure receptacle or sump. The compartment 20 is filled with fluid under the pressure of the conduit 9, and the fluid pressure acting on the larger face of the piston 17 in the compartment 20 holds the rod 18 against the force of the spring 19 in the illustrated retracted position in which the vent conduit 13, 14 is open. The orifice 27 is blocked by the rod 26 under the force of the spring 25, the fluid pressure in the cylinder of the valve 16 being at or near atmospheric pressure because the valve is connected to the conduit 8 by the control conduit 23. The pressure in the compartment 28 is low as will become presently apparent, and fluid under pressure cannot reach the compartment 28 from the connecting duct 29.

When the non-illustrated control valve of the cylinder 7 is switched, pressure fluid admitted through the conduit 8 moves the plunger 5 inward of the die, whereas fluid present in the conduit 9 and connected vessels is drained to the sump. The check valve 21 maintains the original high liquid pressure in the compartment 20. The liquid material 43 in the injection cylinder 4 which may be molten metal or synthetic plastic in the liquid state, is forced through the gate 33 into the mold cavity 32 after a short period in which the air and other gases trapped in the cylinder 4 are driven into the die.

The liquid pressure in the cylinder 4 rises abruptly when the gas in the gate 33 is replaced by liquid molding material, and this pressure rise is transmitted to the fluid in the cylinder 7, the conduit 8, the control conduit 23, and the auxiliary valve 16. The spring 25, however, is dimensioned and pre-tensioned to resist the resulting forces acting on the piston 24, and the rod 26 is maintained in its blocking position on the orifice 27. Air and other gases are expelled from the mold cavity 32 through the open outlet conduits 13, 14, and may be exhausted through a non-illustrated conventional suction system threadedly sealed to the orifice 14'.

After the mold cavity 32 has been completely filled with liquid molding material 43 injected through the gate 33, and the gases present have been driven off through the conduits 13, 14, another abrupt rise in liquid pressure takes place in the cylinder 4 when the liquid molding material 43 enters the throttling portion 34 of the outlet conduit 13. The pressure increase is propagated to the cylinder 7, conduit 8, control conduit 23, and auxiliary valve 16 with the velocity of sound and constitutes a signal to which the piston 24 responds with movement away from the orifice 27, the spring 25 being selected to yield to the much higher pressure after the second pressure increase.

As soon as a minute gap (a few hundredths of a millimeter) is formed between the rod 26 and the cooperating seating face about the orifice 27, the difference in pressure between the two liquid-filled compartments 20, 28 is equalized. The check valve 31 being connected to the fluid system of the die closing mechanism remains closed under the external pressure. The high pressure in the compartment 28 acts on the radials end face of the rod 26 and quickly moves the rod away from the orifice 27. The withdrawal of the rod 26 against the force of the spring 25 is further hastened by the indirect action of the much stronger spring 19.

As soon as the pressure difference of the compartments 20, 28 is relieved, the spring 19 readily overcomes the hydraulic forces due to the greater piston surface in the compartment 20, and moves the rod 18 into the outlet conduit extension 14. Because the rod 18 has a smaller diameter in the compartment 20 than in the compartment 28, the liquid displaced from the compartment 20 by the movement of the piston 17 cannot be entirely accommodated in the compartment 28 and displaces the rod 26 outward of the connecting duct 29. The orifice 27 thus is fully and practically instantaneously opened by forces great enough not to be affected by any pressure changes that may occur in the control conduit 23 after the movement of the rod 26 away from the orifice 27 has been initiated.

The strong spring 19 moves the rod 18 into its blocking position with sufficient speed to prevent escape of liquid molding material from the outlet conduits 13, 14. The length of the conduits 13, 14, and the spacing between the rod 18 and the throttling portion 34 can readily be selected to permit blocking of the duct 14 before the liquid can flow from the throttling portion of the conduit 13 to the valve-controlled portion of the conduit 14. The amount of liquid contained in the short and narrow connecting duct 29 is very small, and its mass is negligible as compared to that of the rod 18. Disregarding the equally negligible friction effects, the entire force of the multiple-disk spring 19 is thus available for accelerating the rod 18 toward its blocking position. The conduit 14 is tightly sealed before the rod 18 therein is reached by the advancing molding material.

The molding material in the die then is permitted to solidify, and the die is opened for ejection of the molding. When the die is opened, the fluid pressure in the die closing mechanism is relaxed, and the pressure in the conduit 30 drops substantially below that in the valve 16. Pressure fluid is released from the valve 16 through the check valve 31 until the residual pressure in the valve is smaller than the spring pressure on the valve.

When the control valve (not shown) of the cylinder 7 is returned to its original position, the plunger 5 is retracted, and the simultaneous loss of pressure in the control conduit 23 permits the spring 25 to press the rod 26 into sealing engagement with the orifice 27. The increasing pressure in the control conduit 12 opens the check valve 21, and the resulting high hydraulic pressure in the compartment 20, not balanced by a corresponding pressure in the compartment 28, withdraws the rod 18 from the blocking position to the illustrated retracted position. The liquid displaced from the compartment 28 by the movement of the piston 17 is released through the check valve 31 and the conduit 30.

The apparatus is ready to receive a new charge of molding material through the feed opening 42, and a new molding cycle may start after closing of the die. The fluid pressure employed for closing the die and for holding it closed locks the check valve 31. The pressure in the compartment 28 remains insignificantly higher than atmospheric pressure until the auxiliary valve 16 is opened again in the next molding cycle.

Because of the rapid response of the valve arrangement 15, 16 to the pressure signal generated in the cylinder 7, and because of the propagation of the signal at the speed of sound through the control conduit 12, it is possible to relay on the entry of the molding material 43 into the throttling portion 34 of the outlet conduit 13 for generating the signal. The distance of the outlet conduit 13 from the cylinder 7, and the corresponding length of the control conduit 12 are practically irrelevant. The timing of the signal is entirely independent of the basic operating characteristics of the apparatus including the size of the mold cavity and of such process variables as the amount of molding material charged to the injection cylinder 4 or the amount of gases generated in the die during injection. The reliability of the apparatus of the invention thus is inherently very high.

Figure 3:
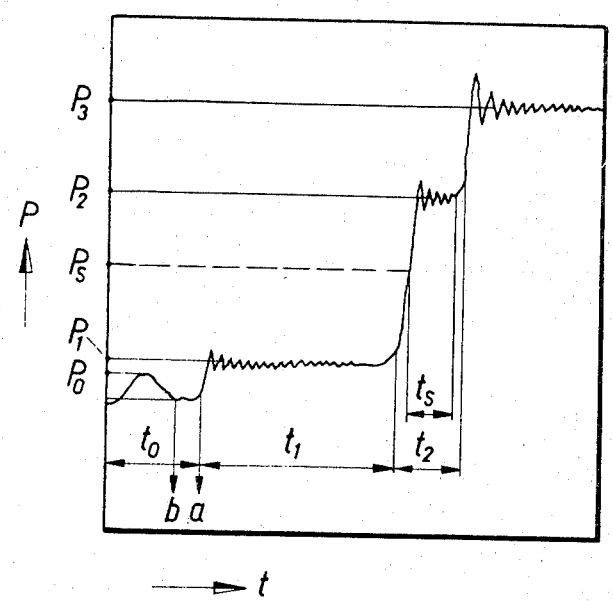
FIG. 3 is a diagram of the pressure changes occurring in the fluid-operated injection actuating mechanism of the apparatus shown in FIG. 1 during an injection shot.

FIG. 3 diagrammatically illustrates the pressure variations occurring in the portion of the cylinder 7 connected to the control conduit 23 during the injecting of zinc diecasting alloy by the plunger 5. The abscissa of the diagram of FIG. 3 indicates time $t$, whereas the ordinate indicates liquid pressure P. The initial pressure rise from $P_0$ to $P_1$ is due to the inertial resistance of the plunger 5 and of the molding material 43 to acceleration toward the die. From the time $b$ the plunger 5 and the molding material move at constant speed through the injection cylinder 4, driving air and such other gases as may be present through the gate 33 into the mold cavity 32, and further through the outlet conduits 13, 14. The resistance encountered by the air flow is insignificant.

At the time $a$, that is, a period $t_0$ after the start of plunger movement, the liquid molding material enters the gate 33 whose flow section is smaller than that of the injection cylinder 4, and the pressure in the actuating cylinder 7 rises abruptly to $P_1$. It remains practically constant at that level while the mold cavity 32 is being filled with molding material over the period $t_1$, the cavity being much wider than the gate. When the cavity is filled and the liquid material enters the throttling portion 34 of the outlet conduit 13, there is another, and much greater pressure increase to a value $P_2$ because the cross-sectional area of the conduit portion 34 is much smaller than that of the gate 33. If the outlet conduit is constituted by several ducts in parallel arrangement, a corresponding relationship is preferably maintained between the effective flow section of the gate and the combined effective flow sections of the several outlet ducts.

The pressure $P_2$ is maintained until the liquid molding material flowing through the conduits 13, 14 reaches the portion of the conduit 14 which is blocked by the rod 18. The pressure then again rises to a value $P_3$ corresponding to the fully hydrostatic pressure of which the hydraulic system of the actuating cylinder 7 is capable. The period $t_2$ from the pressure rise to the level $P_2$ to the pressure rise to the level $P_3$ is the time required for the molding material to travel from the throttling portion 34 to the location of the rod 18. The time available for closing the valve 16 thus is represented by the period $t_s$ which begins shortly after the pressure rise from level $P_1$ to level $P_2$, and terminates shortly before the pressure rise from the level $P_2$ to the level $P_3$.

The pressure level $P_0$ varies with the characteristics of the molding machine employed, and with such process variables as the setting of control valves in the hydraulic system of the actuating cylinder 7. The pressure level $P_1$ is greatly influenced by such factors as the specific gravity of the molding material that is being injected, the viscosity changes in the material due to temperature variations, the ratio of the cross sections of the gate opening and of the injecting plunger, the ratio of the cross section of the plunger 5 and that of the actuating piston 6, and the setting of flow control valves in the hydraulic system of the actuating cylinder 7.

Under many conditions, the difference between the pressure levels $P_0$ and $P_1$ becomes very small, and it may actually become zero. If a signal for closing the outlet conduit 13 is derived from a pressure rise in the cylinder 7 to the value $P_1$, premature closing of the conduit 13 may occur during the acceleration of the contents of the injection cylinder 4, and an undesirable amount of gas may be retained in the mold cavity 32. If closing of the valve in the venting conduit is delayed sufficiently to ensure complete removal of gases even in the event of a premature signal at level $P_0$, discharge of liquid molding material from the orifice 14' cannot be safely avoided. It is to be noted that the period from time $b$ to time $a$ in FIG. 3 depends on the extent to which the injection cylinder 4 is filled with molding material, and may vary from shot to shot, thus introducing an additional source of uncertainty.

Much more reliable results are achieved by deriving a valve closing signal from the pressure rise caused by entry of liquid molding material into the venting conduit. This pressure rise may be made as high as desired by suitably dimensioning the throttling portion 34, and may be several times higher than the pressure increases to the values $P_0$ or $P_1$, and is entirely independent of the variables enumerated above and associated with the pressure increase at the beginning of injection. The length of the period $t_2$ can be controlled by the arrangement and the dimensions of the outlet conduits to be longer than the closing time $t_s$ of the valve arrangement under the most unfavorable conditions without significantly affecting the operation of the molding machine.

Figure 4:
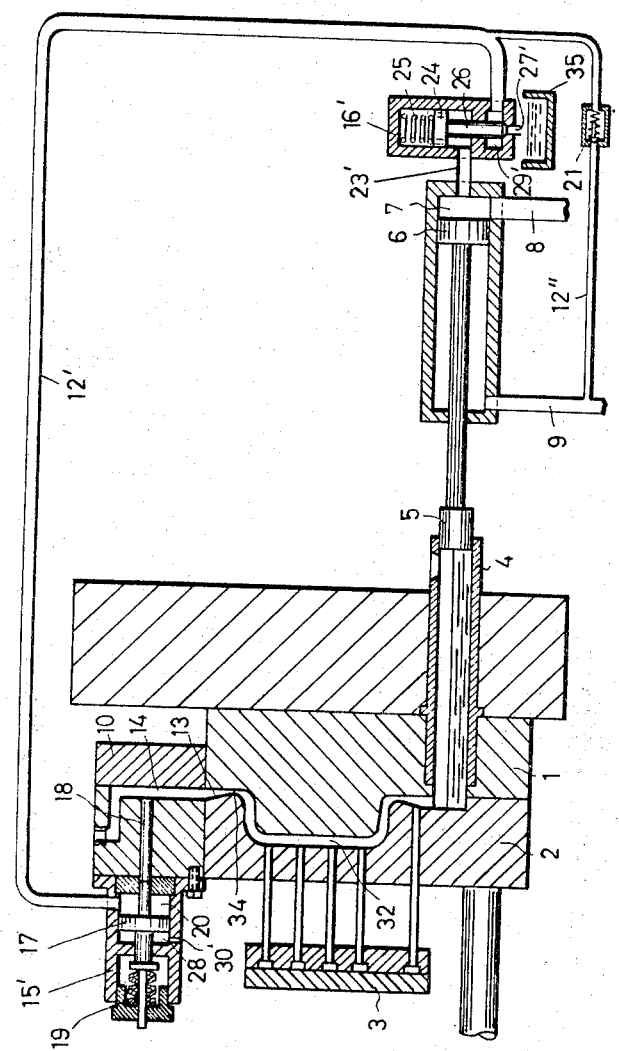
FIG. 4. illustrates the pressure-molding machine of FIG. 1 equipped with a modified vent control mechanism.

While the apparatus illustrated in FIGS. 1 and 2 has great advantages, the method of the invention can be carried out in modified devices, and the apparatus illustrated in FIG. 4 is merely illustrative of such modifications. The molding machine illustrated in FIG. 4 is identical in all significant aspects with that shown in FIG. 1, and corresponding elements have been designated by the same reference numerals.

The auxiliary valve 16' is mounted on or immediately adjacent the actuating cylinder 7 and is directly connected with the cylinder by a control conduit 23' which is very short. A biasing spring 25 urges the rod 26 of a piston 24 against the fluid pressure in the cylinder 7 toward an orifice 27' of a chamber 29' which leads to the atmosphere.

The chamber is sealed to an end of a control conduit 12' whose other end is connected to the compartment 20 of a valve 15' which differs from the afore-described valve 15 mainly by the lack of the connecting conduit 29.

A piston 17 separates the compartment 20 from a compartment 28 which is permanently open to the atmosphere through a vent opening 30'. A rod 18 is fastened to the piston 17 and is biased by a strong spring 19 toward a blocking position in the extension conduit 14.

A branch conduit 12" connects hte control conduit 12' to the conduit 9 which supplies the cylinder 7 with hydraulic fluid for retraction of the plunger 5, and is equipped with a check valve 21 which selectively prevents fluid flow from the valve 15' toward the conduit 9.

In order to ensure rapid operation of the valve system, the cross section of the conduit 12' is approximately one third of the piston face of the piston 17 in the valve 15'. A sump tank 35 is arranged under the orifice 27' for recovery of hydraulic fluid which flows from the auxiliary valve 16' through the open orifice 27' without encountering significant resistance. A long line from the valve 16' to the tank 35 would enclose a substantial body of liquid whose inertia would retard discharge of fluid from the valve 16'.

When in the illustrated position, the apparatus shown in FIG. 4 is ready for injection. The conduit 9 is under the full pressure of the hydraulic system. The liquid pressure holds the plunger 5 in the retracted position. The same pressure prevails in the compartment 20 and keeps the rod 18 out of the outlet conduit 14 against the pressure of the spring 19. The pressure has no bearing on the position of the rod 26 which is held against the orifice 27' by the spring 25. The liquid pressure in the space of the valve 16' connected to the conduit 8 is insignificant.

Upon reversal of the connections to the conduits 8, 9 in the non-illustrated hydraulic system, the conduit 9 is vented, but the resulting drop in pressure cannot pass the check valve 21. The pressure increase occurring in the conduit 8 when the injected liquid reaches the throttling portion 34 initiates movement of the rod 26 away from one orifice 27', and the liquid rushing outward from the valve compartment 20 and the control conduit 12 through the orifice 27' hastens the opening movement of the rod 26. There is a rapid pressure drop in the compartment 20, and the outlet conduit extension 14 is blocked by the rod 18.

The arrangement of the auxiliary valve at a location remote from the shut-off valve is advisable where space limitations make it impossible to mount the auxiliary valve directly on or closely adjacent the shut-off valve. Other arrangements are possible and will readily be resorted to by those skilled in the art.

The molding machine illustrated in FIGS. 1 and 4 is a cold chamber diecasting machine equipped with a horizontal plunger and is of a type commonly employed in the diecasting of zinc alloys, but the invention is not limited to the specific type of molding machine employed, nor to the nature of the material being molded. It will also be appreciated that the hydraulic actuating fluid for the injection mechanism and for the vent control arrangement may be replaced by a compressed gas without altering the basic mode of operation and with only such minor changes in structure, particularly dimensions, as will be obvious to a skilled engineer. Adaptation of the vent control mechanism to a hot chamber molding machine, to a molding machine having a vertically movable plunger, or to an injection molding machine for synthetic resin compositions is specifically contemplated.

Obviously these and other modifications and variations of the present invention are possible in the light of the above teachings. It is therefore to be understood that, within the scope of the appended claims, the invention may be practiced otherwise than as specifically described.

What I claim is:

1. In a method of operating a pressure molding machine having a die formed with a cavity and a vent conduit of substantially smaller flow section than the flow section of the cavity and communicating with the same, the machine including fluid operated injecting means for forcing a liquid molding material into the cavity, there being an increase in the pressure of the operating fluid in said injecting means when said liquid molding material enters said vent conduit from said cavity, the step of blocking said vent conduit in response to said increase.

2. A method of operating a pressure molding machine equipped with a die formed with a cavity therein and a vent conduit of substantially smaller flow section than the flow section of the cavity, said conduit communicating with said cavity, the machine being provided with injecting means for forcing a liquid molding material into said cavity, which comprises generating a signal in response to the entry of said molding material from said cavity into said vent conduit under the action of said injecting means, and blocking said vent conduit in response to said signal.

3. A method of operating a pressure molding machine equipped with a die having a cavity therein and a vent conduit of substantially smaller flow section than the flow section of the cavity, said conduit communicating with said cavity, the machine being provided with pressure-fluid operating plunger means for forcing a liquid molding material into said cavity, which method comprises generating a signal in response to pressure changes in the operating fluid of said plunger means, and blocking said vent conduit in response to a signal generated by a pressure increase of the operating fluid caused by entry of said molding material into said vent conduit under the forcing of said plunger means.

References Cited

UNITED STATES PATENTS

| 2,785,448 | 3/1957 | Hodler | 164—305 |
| 2,867,869 | 1/1959 | Hodler | 164—254 |
| 2,904,861 | 9/1959 | Morgenstern | 164—62 |
| 3,070,857 | 1/1963 | Uenus | 164—256 |
| 3,121,926 | 2/1964 | Morton | 164—257 |

FOREIGN PATENTS

| 866,234 | 2/1953 | Germany. |

J. SPENCER OVERHOLSER, *Primary Examiner.*

R. S. ANNEAR, *Assistant Examiner.*